June 24, 1969
J. J. COLLINS ET AL
3,452,272
METHOD AND APPARATUS FOR MEASURING CAPACITANCE AT
REPEATED INTERVALS INCLUDING AVERAGE
VALUE INDICATING MEANS
Filed Aug. 29, 1967
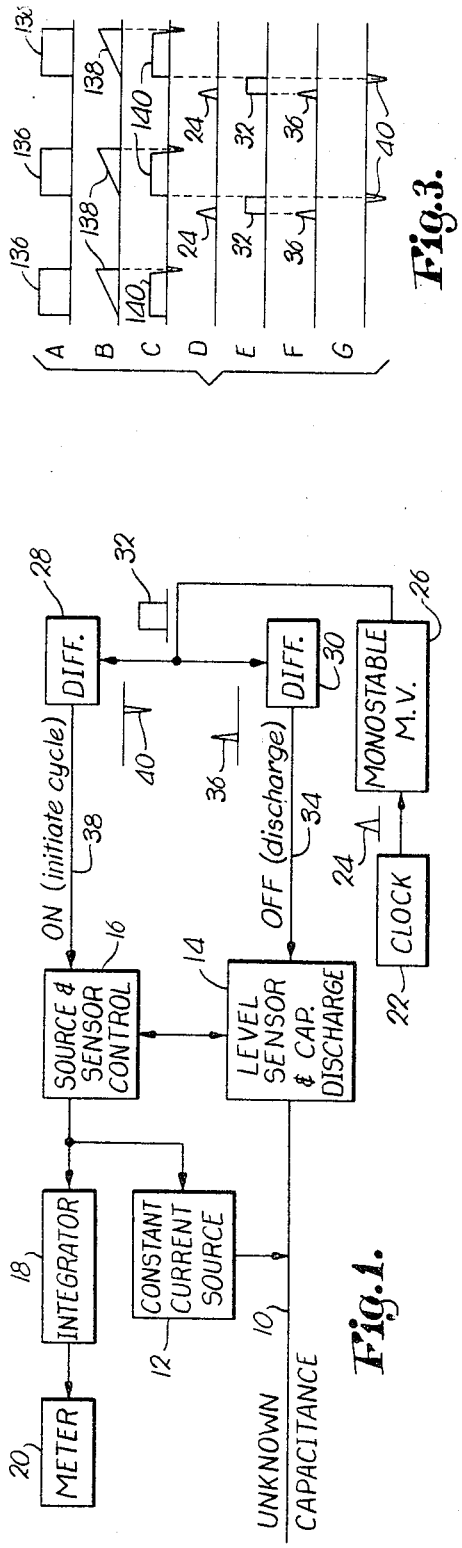
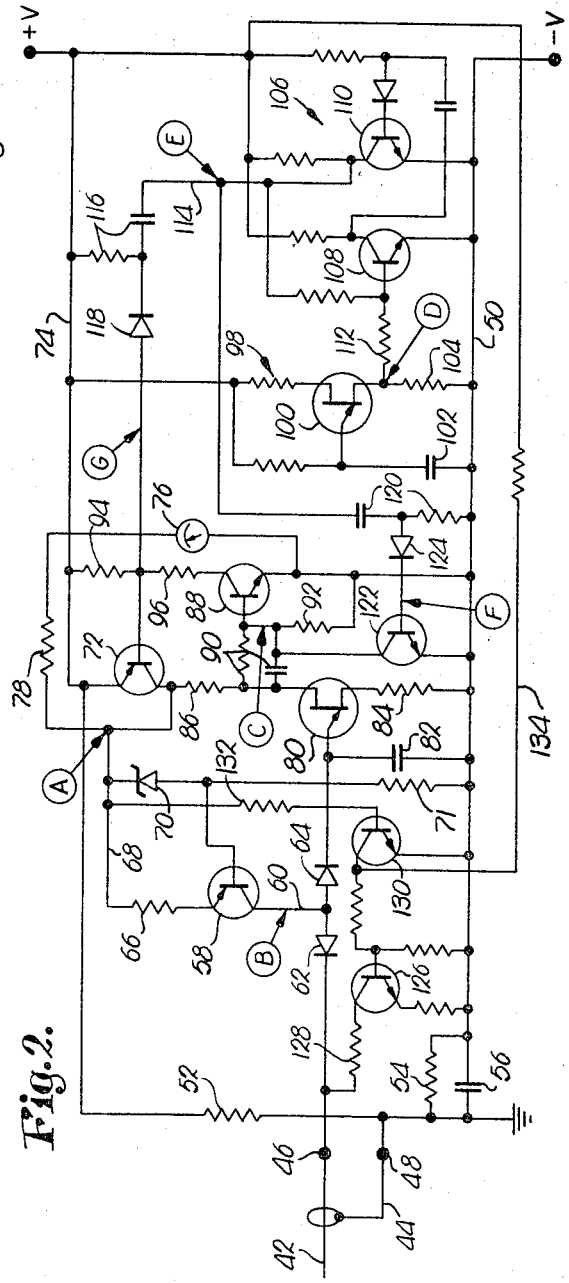
INVENTORS.
John J. Collins
Charles E. Dye
BY Schmidt, Johnson, Hovey,
Williams & Bradley.
ATTORNEYS.

United States Patent Office 3,452,272
Patented June 24, 1969

3,452,272
METHOD AND APPARATUS FOR MEASURING CAPACITANCE AT REPEATED INTERVALS INCLUDING AVERAGE VALUE INDICATING MEANS
John J. Collins, Kansas City, and Charles E. Dye, Lee's Summit, Mo., assignors to Railway Communications, Inc., Raytown, Mo., a corporation of Missouri
Filed Aug. 29, 1967, Ser. No. 664,126
Int. Cl. G01r 27/26
U.S. Cl. 324—60                                        13 Claims

ABSTRACT OF THE DISCLOSURE

The capacitance of a capacitive electrical element, such as a communication cable, is measured by energizing the element with constant current electrical energy, sensing charging of the element to a predetermined, fixed potential, and then discharging the element and repeating the cycle. A rectangular pulse is produced during each cycle which commences when charging begins and terminates when the charge of the element reaches said potential. The cycles are of equal durations, and the pulses are integrated to obtain the average value thereof which is proportional to the unknown capacitance.

---

The problem of locating an open circuit in a communication cable is frequently presented in the servicing of telephone lines and other cables. Heretofore, one approach to the locating of an open has been to employ apparatus which measures the capacitance of the length of the cable extending from the test terminals of such apparatus to the open. Since the capacitance per unit length of the type of cable under test is known or readily ascertainable, the capacitance of the cable length is readily converted into terms of linear distance.

In prior apparatus of the type just briefly discussed, it is frequently required that the operator of the apparatus initiate a particular operating procedure before the capacitance reading is actually obtained. This is naturally time-consuming and, furthermore, subjects the reading obtained to the possibility of error since the reading is based upon the fulfillment of the proper operating procedure for the apparatus.

It is, therefore, the primary object of this invention to provide apparatus for measuring the capacitance of a capacitive electrical element, such as a communication cable, wherein a capacitance reading is automatically obtained once the apparatus is set for the proper range, and wherein such reading is continuously produced as long as the apparatus remains in operation.

As a corollary to the foregoing, it is an important aim of the instant invention to provide a method of determining the capacitance of a capacitive electrical element utilizing constant current electrical energy to energize the element.

Another important object of the invention is to provide a method and apparatus as aforesaid in which a series of rectangular electrical pulses are developed, the width of each pulse being indicative of the time required for the element to charge to a predetermined, fixed potential in response to energization of the element with constant current electrical energy.

Still another important object of this invention is to provide apparatus as aforesaid especially adapted for use in the location of an open circuit in a communication cable and which is unresponsive to alternating current induced in the cable which would otherwise cause an erroneous capacitance reading.

Additionally, it is an important aim of the invention to provide a cable open locater of the capacitance measurement type which compensates for the possible presence of leakage currents flowing between the conductors of the cable in order to assure that an accurate capacitance reading is produced.

In the drawing:
FIGURE 1 is a block diagram of the capacitance measuring apparatus of the instant invention;
FIG. 2 is an electrical schematic diagram of the apparatus as particularly adapted for use as a cable open locater; and
FIG. 3 is a wave form graph illustrating the operation of the circuit of FIG. 2.

Referring to FIG. 1, a capacitive element of unknown capacitance is represented by a line 10 and is excited by a constant current source 12. A voltage level sensor is illustrated at 14, the function of discharge of the capacitor also being included with the level sensor. Electrical circuitry for controlling the operation of the constant current source 12 and the level sensor 14 is shown at 16, and feeds an integrator 18 that drive a voltmeter 20 scaled to read in terms of capacitance or, in the case of communication cable testing, in terms of linear distance if desired.

A clock 22 delivers timing impulses or pulse signals 24 to the control input of a monostable multivibrator or "one-shot" 26, the output of the latter being connected to a pair of differentiating networks 28 and 30. The output characteristic of one-shot 26 in its unstable state is illustrated by a rectangular pulse 32. The differentiating network 30 differentiates the leading edge of pulse 32 to produce an "off" command delivered along line 34 to the level sensor 14. The "off" command is illustrated by the positive spike 36. The differentiating network 28 differentiates the trailing edge of pulse 32 to produce an "on" command which is delivered along a line 38 to the source and sensor control 16. The "on" command is in the form of a negative spike 40.

Before proceeding with a description of the circuitry of FIG. 2, it is informative to first be familiar with the basic operation of the system as illustrated by the block diagram of FIG. 1. The clock 22 delivers a train of the signals 24 spaced at equal time intervals, each pulse signal 24 serving to initiate a measuring interval. Shortly after the commencement of the measuring interval, as will be discussed more fully hereinafter, the "on" command from differentiating network 28 initiates an operational cycle of the capacitance determining means encompassing blocks 12, 14, 16, 18 and 20.

The capacitive element 10 under test is energized by the constant current source 12, and simultaneously a rectangular pulse is initiated and is delivered to the integrator 18. The capacitive element 10 is charged with the constant current, and when the potential thereof reaches a predetermined level, the sensor 14 is triggered to, in turn, cause the control 16 to effect the termination of delivery of current to element 10 and the termination of the recangular pulse fed to integrator 18. Additionally, element 10 is discharged at this time.

The production of the next timing signal 24 initiates another measuring interval and the charging, potential sensing, and discharging of the capacitive element 10 is repeated as above. It may be appreciated that these functions will always occur during each measuring interval as long as such interval is of sufficient length to permit element 10 to charge to the trigger level of sensor 14. Means is provided in the instant invention to prevent meter 20 from displaying erroneous readings in the event that the capacitance of element 10 is outside of the capacitance range for which the apparatus is set, and will be described hereinafter.

The meter 20 is of the direct current type and displays the average value of the series of rectangular pulses delivered thereto by integrator 18. Each measuring interval is of the same duration and the width of each pulse corresponds to the time duration between application of constant current to element 10 and the charging of the latter to the sensing level of sensor 14. Referring to the equation $Q=CV$, where Q represents the charge of a capacitor, C is the capacity thereof, and V is the voltage thereacross, and considering that $Q=IT$, where I is current and T represents time, it may be appreciated that the equation may be rewritten $IT=CV$. Since the charging current I is a constant in the above described apparatus and the voltage V to which the capacitive element 10 is charged is a constant, then the time T is directly proportional to the capacitance C. Therefore, the average value of the integrated pulses indicated by meter 20 is directly proportional to the capacitance of element 10. In practice, the movement of DC meter 20 serves as a mechanical integrator and performs both the integrating and the readout functions.

The structure and operation of the invention briefly described above will now be described in detail with reference to FIGS. 2 and 3. The apparatus of FIG. 2 is especially adapted to the locating of an open circuit in a communication cable, the latter being diagrammatically represented by a pair of conductors 42 and 44, the conductor 42 being in the form of a center wire and the conductor 44 illustrated as a shield surrounding the conductor 42. The conductors 42 and 44 are connected to test terminals 46 and 48 respectively, the terminal 48, and hence conductor 44, being maintained at earth ground as indicated by the symbol. In practice, the open conductor of a conductor pair would be connected to test terminal 46, and the other conductor would be connected to the cable shield and thus to test terminal 48.

The apparatus of FIG. 2 is operated from a direct current power supply (not shown), the positive side of the supply being connected to the terminal labeled +V. The negative side of the supply is connected to the terminal labeled −V, the latter being connected to a common lead 50 which is circuit ground. It should be understood that the circuit ground formed by common lead 50 and the mentioned earth ground are at different electrical potentials by virtue of the provision of a voltage divider comprising series resistors 52 and 54. A capacitor 56 serves as an alternating current bypass in shunt relationship to resistor 54. The significance of the elevating of earth ground above the potential of chassis ground will be discussed hereinafter.

The constant current source is provided by a PNP transistor 58 having an output lead 60 from its collector connected to the anodes of a pair of back-to-back diodes 62 and 64. The emitter of transistor 58 is connected through a resistor 66 to a lead 68. A Zener diode 70 connects the base of transistor 58 to lead 68, and a resistor 71 connects the base to the ground lead 50.

The delivery of supply voltage to the constant current source is controlled by a PNP gating transistor 72 which has its emitter connected to a lead 74 extending from the positive supply terminal to the voltage divider resistor 52. The collector of transistor 72 is connected to lead 68 and to a DC microammeter 76 through a series calibration resistor 78. The other side of meter 76 is returned to the circuit ground lead 50.

A unijunction transistor 80 performs the level sensing function and has its emitter connected to the cathode of diode 64, the cathode of the diode 62 being connected to test terminal 46. These two diodes in conjunction with a capacitor 82 connected between the emitter of transistor 80 and circuit ground 50, provide an alternating current rejection circuit to prevent positive and negative excursions induced in cable conductors 42 and 44 from causing erroneous potential sensing by the transistor 80.

The base one of transistor 80 is connected to ground lead 50 by a resistor 84, and the base two thereof is connected to the collector of gating transistor 72 by a resistor 86, and to the base of an NPN gating transistor 88 by a parallel connected resistor and capacitor combination 90. The emitter of transistor 88 is connected to ground lead 50, and the base thereof is connected to the ground 50 by a resistor 92. The collector of transistor 88 is in the bias circuit of gating transistor 72, a resistor 94 being connected between lead 74 and the base of transistor 72, and a resistor 96 being connected to the collector of transistor 88 in series with resistor 94.

A free-running multivibrator stage 98 serves as the clock and utilizes a unijunction transistor 100 which repeatedly discharges a capacitor 102 through a resistor 104. The capacitor 102 is connected from the emitter of transistor 100 to the ground lead 50, and the resistor 104 is connected from the base one thereof to ground lead 50.

A monostable multivibrator stage 106 employs a pair of NPN transistors 108 and 110 and has an input resistor 112 connected to the base one of unijunction transistor 100. The output of stage 106 is taken at the collector of transistor 110 and appears along a lead 114.

An RC differentiating network 116 is interposed in lead 114, together with a blocking diode 118 having its anode connected to the base of gating transistor 72. A second RC differentiating network 120 connects lead 114 to the base of an NPN switching transistor 122 through a blocking diode 124, the latter having its cathode connected to such base. The emitter-collector circuit of transistor 122 is connected between the base of gating transistor 88 and the circuit ground lead 50.

An NPN switching transistor 126 is utilized to discharge the cable 42, 44 and has its emitter-collector circuit connected between test terminal 46 and circuit ground 50. A series resistor 128 in the collector circuit suppresses cable ringing caused by loading coils or other inductors on the cable. The switching transistor 126 is operated by an NPN inverter transistor 130 which has its base connected to lead 68 by a resistor 132. The collector of transistor 130 is connected to the positive supply voltage terminal by a lead 134.

OPERATION

The wave form graphs of FIG. 3 are labeled A through G and corresponding designations appear in FIG. 2 and indicate the locations in the circuitry where the various wave forms appear. Each of the wave forms is a plot of voltage versus time, and the broken projection lines are utilized to show time alignment among the various wave forms.

With the cable conductors 42 and 44 of the cable under test connected to the test terminals 46 and 48, supply voltage is made available to the circuitry by an on-off switch (not shown) and the first measuring interval is initiated by the free-running multivibrator stage or clock 98. With reference to FIG. 3, it will be assumed that at least one measuring interval has elapsed and that the first clock timing signal 24 illustrated is being produced. This is shown in graph D and represents the voltage appearing at the base one of unijunction transistor 100.

The timing signal 24 triggers the one-shot 106 and places the same in its unstable state. In such state, transistor 108 is turned on and transistor 110 is turned off, resulting in the production of the positive rectangular pulse 32 appearing on lead 114. The leading edge of pulse 32 (graph E) is differentiated by network 120 to produce the spike 36 shown in graph F which is applied to the base of switching transistor 122. This is the "off" command illustrated in the block diagram of FIG. 2; the function thereof will be set forth hereinafter after the operation of the measurement circuitry is discussed. At this juncture, it is sufficient to understand that the duration of pulse 32 defines a delay period necessary at the outset of the interval to preclude erroneous indications by meter 76. The delay period expires at the trailing edge of pulse 32 which is differentiated by network 116, thereby producing the negative spike 40 which is delivered to the base of gating transistor 72 and comprises the "on" command illustrated in FIG. 1.

The negative spike 40 turns on gating transistor 72 which, in turn, increases the voltage on the base two of unijunction transistor 80 and also renders gating transistor 88 conductive. Supply voltage is now delivered to lead 68 as indicated in graph A by the leading edge of the corresponding rectangular voltage pulse 136. The constant current source comprising transistor 58 and its associated components is thus rendered operative and current is supplied via lead 60 and diode 62 to cable conductor 42.

With an open existing in the cable the latter will charge since the cable conductors 42 and 44 effectively form the plates of a capacitor. The charging of the cable is illustrated by graph B in FIG. 3 where sawtooth waves 138 show that the cable charges linearly with time to a predetermined voltage level represented by the trailing edge of each of the waves 138. This voltage level is the firing potential of the emitter of the unijunction transistor 80. The graph C of FIG. 3 illustrates the voltage characteristic of the base of gating transistor 88, which is effectively the characteristic of the base two of unijunction transistor 80. It may be seen that firing of transistor 80 causes the voltage at base two to drop rapidly as evidenced by the wave form 140. This renders transistor 88 nonconductive to, in turn, turn off transistor 72. With transistor 72 now in its nonconductive state, supply voltage is removed from transistor 58 and the constant current output thereof terminates.

During the time that transisor 72 was conducting, the microammeter 76 was receiving the rectangular voltage pulse 136 since meter 76 and its series calibration resistor 78 are connected between the collector of transistor 72 and the circuit ground lead 50. As is evident from the graphs of FIG. 3, the rectangular voltage pulse 136 ceases when the unijunction transistor 80 fires and meter 76 is no longer energized. It may be appreciated, however, that repeated measuring intervals cause a train of the pulses 136 to be delivered to meter 76; thus the reading thereof represents the average value of a number of the pulses 136. Manifestly, the greater the capacitance of the cable 42, 44, the greater the width of each of the pulses 136, i.e. the longer the duration of each pulse 136 before termination thereof by the firing of transistor 80. Therefore, the average value of such pulses indicated by meter 76 is proportional to the capacitance of the cable, and the meter may be scaled accordingly or in terms of linear distance if use with a cable of one particular capacitance characteristic is contemplated.

During the time that transistor 72 is conducting and transistor 58 is supplying current to the cable, the inverter transistor 30 is in its conductive state by virtue of the connection of its base to lead 68 via resistor 132. When the unijunction transistor 80 fires and positive supply potential is removed from lead 68, the inverter transistor 130 is turned off which, in turn, biases transistor 126 into its conductive state. This discharges the cable from conductor 42 to circuit ground 50 through the ring suppression resistor 128, the latter serving to damp any ringing caused by inductive loading. Therefore, the cable is discharged substantially at the time that the unijunction transistor 80 is triggered.

If it is desired that the apparatus have a duty cycle of greater than approximately 50%, provision must be made for discharging a capacitor having a capacitance beyond the range of the apparatus or erroneous meter reading will be produced. It should be understood that a capacitor which will not charge to the firing potential of unijunction transistor 80 during the measuring interval between successive timing signals 24 would otherwise cause an erroneous indication because the capacitor would not be discharged at the time the charging current of the next interval commences. This is accomplished in the instant invention through the use of a delay period at the beginning of each measuring interval defined by the output pulse 32 of the one-shot 106. When the timing signal 24 that initiates the subsequent measuring interval is produced, the positive spike 36 reduces the positive potential on the base two of unijunction transistor 80 by rendering transistor 122 conductive. This has the same effect on the circuitry as if unijunction transistor 80 fired, and hence causes transistor 126 to be placed in conduction to discharge conductor 42 to the circuit ground 50. Of course, if such discharge has already occurred due to the firing of transistor 80 during the previous cycle, the operation of transistor 122 by the positive spike 36 has no effect on the condition of the circuitry. Therefore, the significance of the "off" command illustrated in the block diagram of FIG. 1 may now be appreciated, it being evident that the differentiator 30 of FIG. 1 comprises the RC network 120 and associated diode 124 of FIG. 2. The "on" command subsequently produced at the termination of pulse 32 is indicated in FIG. 1 as being delivered by differentiator 28, the latter corresponding to the RC network 116 and associated diode 118 of FIG. 2.

In the utilization of the teachings of the instant invention to determine the linear distance to an open in a communication cable by measurement of the capacitance of such cable existing between test terminals 46 and 48 and the open, an inaccurate reading of the value of the cable capacitance will be obtained if a leakage current exists between the two cable conductors 42 and 44. This is obviated in the instant invention by the use of the voltage divider 52, 54 which maintains conductor 44 and earth ground at a potential greater than circuit ground 50. The values of resistors 52 and 54 are selected to bias the conductor 44 to a potential with respect to circuit ground 50 equal to one-half of the firing potential of the unijunction transistor 80, which is also with respect to circuit ground 50. Therefore, energy is actually being dissipated by the cable into the measuring circuitry during the first one-half of the charging time of the cable represented by the width of the sawtooth wave 138. During the second half of the duration of wave 138, energy is transferred from the constant current source (transistor 58) to the cable as discussed above. Although the cable is actually discharging half of the time and charging during the remaining half, the effect at the emitter of unijunction transistor 80 is the same as would be the case if the cable were charging over the entire period and conductor 44 (earth ground) and circuit ground 50 were at the same potential.

Since the cable is discharging half of the time and charging during the remaining half as discussed above, resistance effects (leakage currents) are cancelled because the leakage increases the discharge rate and decreases the charging rate by the same amount. Therefore, the net effect is that the cable reaches the same voltage level at the same time whether or not leakage resistance is present. This will cause some distortion of the linear ramp of the sawtooth wave 138, but the width of the wave will be unaffected and thus no error will be introduced into the measurement.

Another possible source of error in the capacitance measurement of cables is the presence of an induced alternating current in the cable which may, for example, be caused by the proximity of the cable to a high voltage transmission line. The induced positive and negative excursions are rejected in the instant invention by the action of the back-to-back diodes 62 and 64 and the provision of the capacitor 82 between the emitter of transistor 80 and circuit ground 50. The diode 62 blocks positive excursions while the diode 64 blocks negative excursions. During the time that diode 62 is blocking, current delivered by transistor 58 along output lead 60 is received by the capacitor 82 through the diode 64. In this manner, such positive excursions are prevented from triggering transistor 80. When negative excursions appear, diode 64 blocks and all of the current from transistor 58 is received by the cable through diode 62. The cumulative effect of positive and negative excursions, therefore, is to cause the ramp of the sawtooth wave 138 to assume a stair-step form which is a much closer approximation of the ideal ramp than would be produced if voltage fluctuations in the cable due to an induced alternating current were permitted to reach the measuring circuitry.

Utilizing the circuitry as discussed above wherein a delay period is provided at the beginning of each measuring interval in order to accommodate a duty cycle which may approach 100%, an unknown capacitance of a value outside the range of the apparatus will be indicated to the operator by an off-scale reading of meter 76. The operator then knows that he must switch to a different range capable of accommodating a greater capacitance than the existing range. This is accomplished by utilizing a slower clock (increasing the duration of each measuring interval) or by increasing the level of the constant current output from transistor 58. It is evident that the clock speed may be readily changed by switching to different RC components in the multivibrator stage 98, and that the output of transistor 58 may be changed by varying the emitter resistor 66.

For duty cycles on the order of 50% or less, the delay period for assuring capacitor discharge at the beginning of each measuring interval is not required. This may be appreciated when it is considered that, for example, with a 30% duty cycle, the full-scale reading of meter 76 would correspond to a pulse width for pulses 136 equal to only 30% of the total time period between the leading edge of each pulse 136 and the next timing signal 24 from the clock. Although the number of components of the apparatus may be reduced by the elimination of the above-mentioned delay period, the efficiency of the instrument is correspondingly decreased.

Having thus described the invention, what is claimed as new and desired to be secured by Letters Patent is:

1. A method of measuring the capacitance of a capacitive electrical element, said method comprising the steps of:
   energizing the element with constant current electrical energy;
   sensing charging of the element to a predetermined, fixed potential;
   discharging the element when the charge thereof reaches said potential;
   continuing to energize the element, sense said potential, and discharge the element as aforesaid at repeated intervals;
   deriving a pulse of substantially constant amplitude during each of said intervals having a width indicative of the charging time of the element to said potential; and
   determining the average value of a series of said pulses, whereby said value is proportional to said capacitance.

2. The invention of claim 1, wherein is provided the further step of:
   timing said intervals to provide the latter with equal durations.

3. The invention of claim 2,
   said pulse deriving step including initiating each of said pulses upon commencement of application of said energy to the element, and terminating each pulse when the charge of the element reaches said potential.

4. The invention of claim 2,
   said determining of the average value of said series of pulses including integrating said series.

5. Apparatus for measuring the capacitance of a capacitive electrical element, said apparatus comprising:
   terminal means adapted for coupling with said element;
   a source of constant current electrical energy coupled with said terminal means;
   a clock for producing a train of timing signals each defining the commencement of a measuring interval;
   control and measurement circuitry coupled with said clock and responsive to each of said signals respectively for effecting the application of said energy to said terminal means to charge said element,
   said circuitry being coupled with said terminal means for sensing charging of said element to a predetermined, fixed potential, and for discharging said element prior to the next application of said energy thereto,
   said circuitry including means for providing a pulse of substantially constant amplitude during each of said intervals having a width indicative of the charging time of said element to said potential; and
   means coupled with said pulse providing means for determining the average value of a series of said pulses, whereby said value is proportional to said capacitance.

6. The invention of claim 5,
   said circuitry having means effecting said discharging of the element in response to said sensing of the charging of the element to said potential.

7. The invention of claim 5,
   said pulse providing means initiating each of said pulses upon said application of said energy to said terminal means, and terminating each pulse in response to said sensing of the charging of the element to said potential.

8. The invention of claim 5,
   said intervals being of equal durations,
   said average value determining means including an integrator.

9. The invention of claim 5,
   said circuitry further including an electrically responsive, bistate device operable to undergo a change of state when said element charges to said potential, and means effecting said discharging of the element in response to said change of state,
   there being circuit means responsive to said signals and coupled with said circuitry for delaying the application of said energy to said terminal means for a predetermined period after the production of each of said signals,
   said circuit means causing said device to undergo said change of state at the beginning of each of said periods, and hence at the commencement of each of said intervals, if the change of state was not effected by the charging of the element during the preceding interval, whereby to discharge the element before recharging thereof in the event that the charging time of the element is beyond the range of the apparatus.

10. The invention of claim 5 in which said element is a communication cable having a pair of conductors, said terminal means including a pair of terminals adapted to have respective conductors coupled thereto, said source having an output coupled with one of said terminals and with a voltage reference point; and means coupled with said terminals for biasing the other of said terminals to a voltage level intermediate said reference point and said potential, whereby to cancel the effect of any leakage current between the conductors.

11. The invention of claim 10,
    said voltage level being one-half of said potential with respect to said reference point.

12. The invention of claim 5 in which said element is a communication cable having a pair of conductors,
    said terminal means including a pair of terminals adapted to have respective conductors coupled thereto; and
    alternating current rejection means interconnecting one of said terminals, the output of said source, and said circuitry,
    said rejection means including first unidirectional current carrying means for conducting current from said source to said one terminal, second unidirectional current carrying means for conducting current from said source to said circuitry, and a capacitor coupled with said second current carrying means for receiving the current conducted thereby, whereby to prevent positive and negative alternating current excursions induced in said cable from reaching said circuitry and causing the latter to erroneously sense said potential.

13. The invention of claim 12, said circuitry having means coupled with said second current carrying means for effecting the sensing of said potential, and means coupled with said one terminal ahead of said rejection means for discharging said cable in response to the sensing of said potential.

References Cited

UNITED STATES PATENTS

| | | | |
|---|---|---|---|
| 2,743,418 | 4/1956 | Nichols et al. | 324—68 |
| 3,042,859 | 7/1962 | Shillington | 324—60 |
| 3,290,586 | 12/1966 | Anderson | 324—52 |

EDWARD E. KUBASIEWICZ, *Primary Examiner.*

U.S. Cl. X.R.

324—52